L. WAGNER.
AGRICULTURAL MACHINE.
APPLICATION FILED MAY 16, 1916.
1,251,945.
Patented Jan. 1, 1918.
2 SHEETS—SHEET 1.
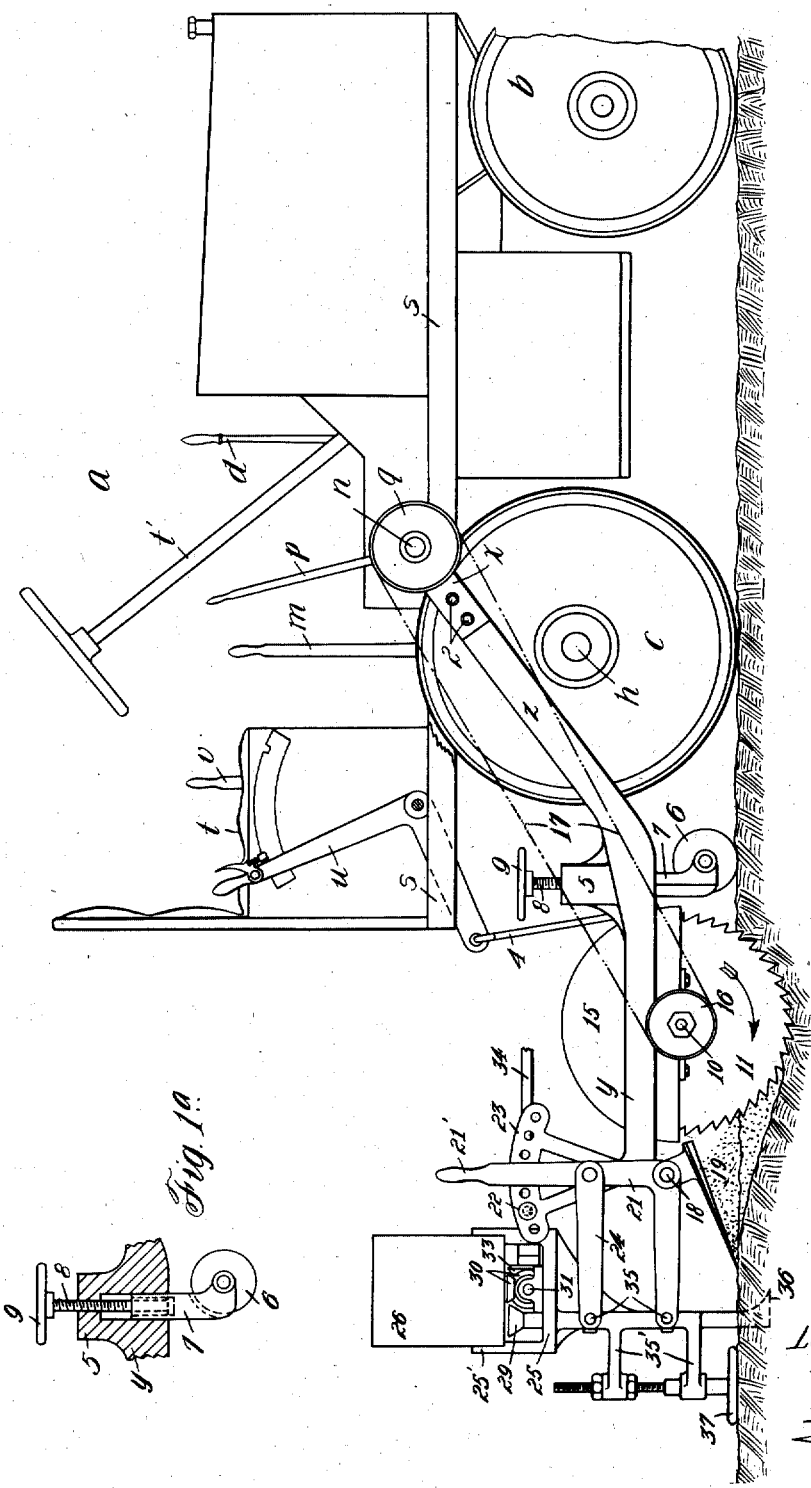
INVENTOR
Louis Wagner.
BY
ATTY.

L. WAGNER.
AGRICULTURAL MACHINE.
APPLICATION FILED MAY 16, 1916.
1,251,945.
Patented Jan. 1, 1918.
2 SHEETS—SHEET 2.
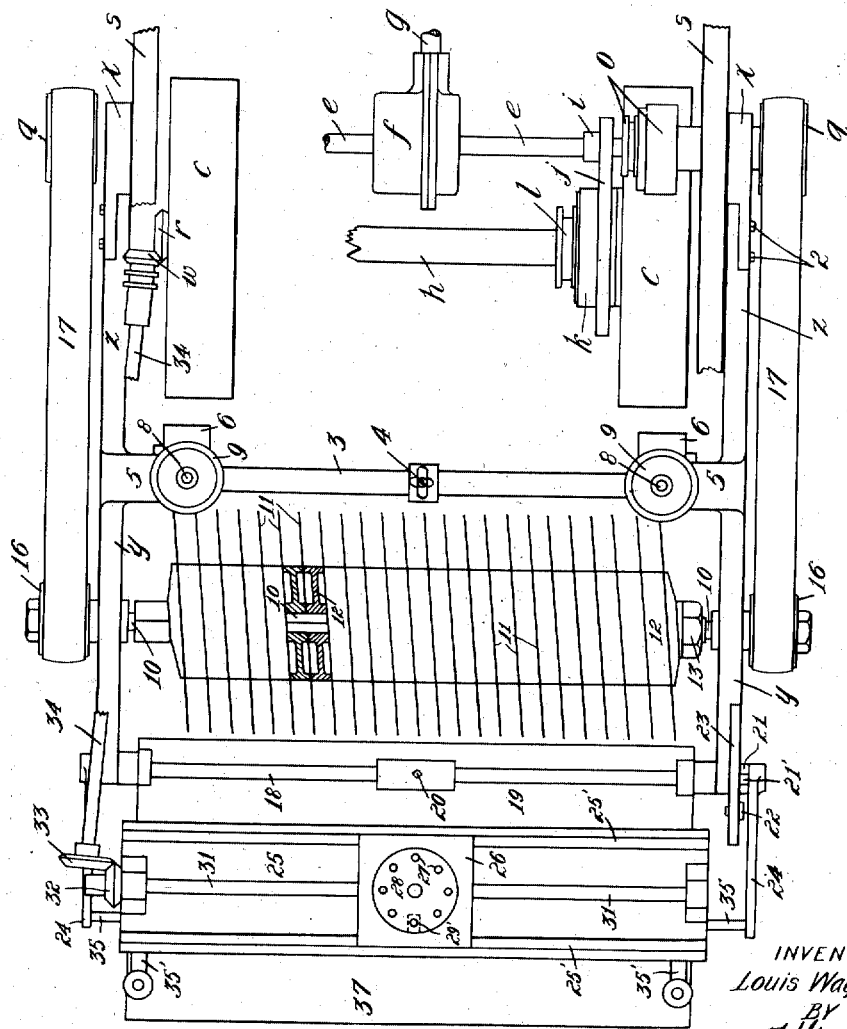
INVENTOR
Louis Wagner
BY
J. J. Geisler
ATTY.

UNITED STATES PATENT OFFICE.

OUIS WAGNER, OF NEWBERG, OREGON, ASSIGNOR OF ONE-HALF TO EDWARD CREDE, OF NEWBERG, OREGON.

AGRICULTURAL MACHINE.

1,251,945.  Specification of Letters Patent.  Patented Jan. 1, 1918.

Application filed May 16, 1916. Serial No. 97,955.

*To all whom it may concern:*

Be it known that I, LOUIS WAGNER, a citizen of the United States, and a resident of Newberg, Yamhill county, State of Oregon, have invented a certain new and useful Improvement in Agricultural Machines, of which the following is a specification.

The object of my invention is to provide a machine by which the steps of preparing the soil, and seeding, may be efficiently performed. The advantage of thoroughly pulverizing the soil is well known. To this end my machine comprises a plurality of disks the periphery of which is provided with small saw-like teeth, and the disks rotate on inclined axis so disposed that each disk in its complete rotation will act upon the full width of the soil lying between planes of adjoining disks. My machine further embodies means for rotating these disks at a high rate, also for regulating the depth of the cut and pulverizing work done by the disks and leveling the pulverized ground; it also includes means for planting seed in the prepared ground and relatively to the depth to which the soil has been pulverized. If preferred, the disks may be arranged in divided units, the disks of one unit being inclined oppositely to the disks of the other unit. It is further my object to arrange and build my machine in convenient and compact form.

Other special features and the general construction and operation of my machine are hereinafter fully described.

In the accompanying drawings:

Figure 1 is a side elevation of my device;

Fig. 1ª is a sectional detail of construction;

Fig. 2 is a fragmental view of the device; and

Fig. 3 shows an alternate arrangement of the pulverizing device when the latter is used for cultivating on opposite sides of rows, after the ground has been planted.

$a$ represents a tractor, of which $b$ are the front wheels, $c$ the rear wheels, $d$ the ordinary clutch operating lever, and $e$ the jack shaft of the transmission. The jack shaft is made with floating ends connected by a differential gearing which is indicated by the housing $f$, and $g$ is the power shaft of the tractor. For facilitating the operation of turning, the rear wheels of the tractor are adapted to be driven independently, and to this end the said wheels $c$ are loosely journaled on an axle $h$. A sprocket $i$ on the jack shaft $e$ is connected by a chain drive $j$ with a sprocket which is fixed on a normally idle clutch member $k$. A longitudinally movable clutch member $l$, connected with the wheel $c$, is adapted to be shifted into engagement with the clutch member $k$ by means of a lever $m$ shown only in Fig. 1. In this way either or both of the wheels $c$ may be driven. Adjacent the outer ends of the jack shaft $e$ are floating shafts $n$, adapted to be thrown into or out of engagement with said jack-shaft ends by friction clutches $o$ controlled by operating levers $p$. On the outer ends of the shafts $n$ are fixed pulleys $q$. One of the tractor wheels $c$ is provided on its outer side with a bevel gear $r$, shown only in Fig. 2. $s$ represents the beams of the tractor chassis, $t$ is the driver's seat, $t'$ is the steering column, and $u$ is a bell-crank lever pivoted in the position shown in Fig. 1. A shifting lever $v$ is mounted on the truck at the left of the driver's seat, the function of this lever being to shift a longitudinally movable bevel gear $w$ into and out of engagement with the gear $r$. Arms $x$ are pivotally supported by the chassis beams, said supports being concentric with the shafts $n$.

The tractor thus far detailed represents a type of common construction, but embodying several additional novel features not ordinarily used in other tractors. I merely illustrate this tractor for the purpose of showing a suitable power device adapted to be used in connection with the parts which form the major portion of my invention. These latter parts are in the form of a combined device adapted to be attached to the tractor as extra equipment, and when detached the tractor may be used for ordinary farm work.

A frame $y$ is provided with parallel arms $z$ adapted to be connected to the arms $x$ by the bolts 2. Said frame $y$ is provided with a cross member 3, and the latter is connected to an arm of the bell-crank lever $u$ by a cable 4. In this way when the lever $u$ is rocked forward the frame $y$ will be lifted and the parts carried by said frame elevated clear of the ground. The outer ends of the frame $y$ are supported by standards 7, vertically adjustable in boxes 5 by rotating the screws 8 provided with hand-wheels 9. In this way the depth of the work done by the disks 11 is regulated. An arbor 10, the center portion of which is of square cross-section, is rotatably journaled transversely beneath the frame y, and a plurality of saw-like disks 11, having square centers adapted to fit the squared portion of the arbor, are assembled in the position shown in Fig. 2. The disks are spaced apart by the spacers 12 and clamped firmly in place by a nut 13. Furthermore, the outside distance between the end disks is slightly greater than the outside distance between the tractor wheels c, so that the earth compressed by said wheels will be acted upon. The peripheral teeth of the disks are made of small size and saw-like, so as to cut readily. As already stated, I depend upon the high rate at which the disks are driven for effecting the pulverizing of the soil. For the purpose of safety, the disks are covered by a guard casing 15, which is omitted in Fig. 2. On the ends of the arbor 10 are pulleys 16 connected with the pulleys q by driving belts 17. It will be noted that the disks 11 are all parallel and located angularly with respect to their axis of rotation. The purpose of this arrangement is to cause the disks, in their operation, to act upon the full width of the soil lying between the planes of adjoining disks. When the clutch members o are in engagement, the pulleys q will be driven at a higher rate of speed, and this drive will be transmitted through the medium of the belts 17 to the disks, causing the latter to rotate in the direction indicated by the arrow in Fig. 1 at a very high speed, so as to thoroughly pulverize the ground to a uniform depth, which depth is regulated by the rollers 6.

Supported at the rear end of the frame y is a transverse shaft 18, on which is mounted an adjustable baffle-board 19, adapted to be set at the required angle by means of the set-screw 20. The earth thrown backward by the rotating saws will strike this baffle-board and be leveled out by the latter. Bell-cranks 21 are fixed on opposite ends of the shaft 18 and one of said bell-cranks is made with a lever handle 21', by means of which said bell-cranks may be rocked. A pin 22 removably mounted in one of the holes of a quadrant 23, the latter being rigidly mounted on the frame y, forms a stop to limit the counter-clockwise rotation of said bell-cranks. Links 24, parallel with the lower arm of the bell cranks, are pivoted at one end to the upright arm of the bell cranks, and provide for a parallel movement of the planting device which is supported by these parts. This planting device is constructed substantially as follows: 25 represents a rigid frame, including horizontal guides 25', and 26 is a tank carrying the seeds, said tank being adjustably mounted in said guides. 27 represents holes in a rotatable plate 28 in the bottom of the tank and through which seeds are adapted to be dropped into a vertical pipe 29, when brought into proper registration. 28' is a brush or block which regulates the feed of seeds. The plate 28 is rotated horizontally, on a vertical axis, by means of bevel gears 30, one of the latter being fixed on a driven shaft 31. The shaft 31 is mounted in bearings on the frame 25, and has on its outer end a bevel gear 32. The latter is in mesh with and driven by a bevel gear 33, which is fixed on one end of a square shaft 34, and on the other end of the latter is slidably mounted the gear w, which is adapted to be placed into or out of engagement with the gear r by means of the lever v, shown in Fig. 1. The planting device is further provided with lateral arms 35 which are supported by the outer ends of the links 24, and the lower arms of the bell cranks 21. The vertical pipe 29 has a foot 36 which projects down into the ground and forms a guide for the seeds which are deposited into the ground at uniform intervals. An adjustable follow-board 37 is mounted on lateral arms 35' at the rear of the planting device, as shown in Fig. 1, and is adapted to perform the two-fold function of acting as a gage to regulate the depth at which the seeds are planted, and also to follow in the rear of the planting foot so as to cover over the furrows made by the latter, and to further level off the earth. The planting device is for the greater part of well known construction, and is therefore not fully detailed herein, but merely shown in more or less diagrammatic form because of its close association with the major portion of my invention.

The general operation of my invention may be summarized as follows: The parts are first assembled as shown in Figs. 1 and 2, the rolls 6, baffle-board 19 and follow-board 37 being adjusted to the proper degree. When the engine is started and all clutch elements engaged, the tractor will move forward, driving the saws of the earth pulverizer at a high speed in the direction indicated in Fig. 1. The earth will be thoroughly pulverized to very fine particles, and the baffle-board will level said earth out to a smooth surface. The planting device will then operate so as to deposit seeds at the proper depth and intervals, after which the follow-board will cover up the furrows and put a finishing level on the earth.

When the device is to be turned, one of the clutch levers m is operated, depending on the direction in which the turn is to be made, the lever v is thrown so as to disengage the gears r and w, and thereby disconnect the drive on the seeding device, the clutch levers p are operated so as to disconnect the drive on the pulverizing device, and the bell-crank lever u is rocked forward so as to lift the entire pulverizing and planting apparatus clear of the ground. The action of the operating parts is reversed whenever the machine is to be again placed in active operation.

The alternate construction of earth pulverizer shown in Fig. 3 is used when the device is to be operated for cultivating the earth after planting. In this construction the pulverizer consists of two sections A and B, symmetrically located with respect to a transverse center line, and spaced apart as shown, for the purpose of straddling a row of plants. When this device is used, the planting apparatus is, of course, dispensed with.

From the description of parts and the explanation of their functions, it is obvious that the machine represented in this application is a combined machine, operable by one man, and adapted to perform simultaneously, in a single operation, the steps hitherto performed by a series of operations. In other words, where formerly the ground was required to be plowed, then harrowed, and frequently reharrowed, before planting, the work of preparing the ground and planting is performed by this machine in operating once over the ground. The advantages of such device as an economist of time and labor is readily apparent. Of course, the structure shown in the drawings may be greatly modified without departing from the spirit of the invention, and I consider myself entitled to use this machine in the manner most conformable to the work to be done.

I claim:

1. A machine of the character described comprising a wheel mounted body, a rearwardly extending frame hinged to such body, earth working means rotatably mounted in the free end of said frame, means for supporting the free end of said frame above the ground, a baffle board supported by said frame behind said earth working means and adapted to confine and level again the earth thrown up by said earth working means, means for driving the earth working means at a high rate, and a seeder supported by said frame behind the baffle board adapted to discharge its seed in the furrow of the pulverized soil prepared by the earth working means, the supporting means of the seeder being adapted to permit vertical movement of said seeder and including a support bearing on the ground.

2. A machine of the character described comprising a wheel mounted body, a rearwardly extending frame hinged to such body, earth working means rotatably mounted in the free end of said frame, means for supporting the free end of said frame above the ground, a baffle board supported behind said earth working means and adapted to confine and level again the earth thrown up by the earth working means, means for driving the earth working means at a high rate, a bell crank fulcrumed to the free end of said frame, means for limiting the movement of the bell crank on its fulcrum, a seeder pivotally connected to said bell crank, and a support for said seeder, such support bearing on the ground.

3. A machine of the character described comprising a wheel mounted body, a rearwardly extending frame hinged to such body, earth working means, means for supporting the free end of said frame above the ground, a baffle board supported by said frame behind said earth working means and adapted to confine, and level again, the earth thrown up by the earth working means, means for driving the earth working means at a high rate, a bell crank fulcrumed to the free end of said frame, means for limiting the movement of the bell crank on its fulcrum, a seeder pivotally connected to said bell crank, and a vertically adjustable support for said seeder, such support bearing on the ground.

4. In a machine of the character described, the combination of revolving earth pulverizing means, a baffle board behind said means and adapted to confine, and level again, the earth thrown up by the same, and a seeder behind the baffle board adapted to discharge its seed down in the furrow of pulverized soil prepared by said earth pulverizing means, the supporting means of the seeder being adapted to permit vertical movement of said seeder and including a support bearing on the ground.

LOUIS WAGNER.